United States Patent

Asai et al.

[11] Patent Number: 5,889,100
[45] Date of Patent: Mar. 30, 1999

[54] RESIN COMPOSITION AND MOLDED OBJECT THEREOF

[75] Inventors: Kunihiko Asai; Tomio Takada; Hideo Yamamoto; Kunio Yamamoto, all of Kanagawa; Yoshihisa Saiki; Takeshi Ogawa, both of Saitama, all of Japan

[73] Assignees: Japan Polyolefins Co., Ltd.; Honda Giken Kogyo Kabushiki Kaisha, both of Tokyo, Japan

[21] Appl. No.: 938,628

[22] Filed: Sep. 26, 1997

[30] Foreign Application Priority Data

Sep. 27, 1996 [JP] Japan .................................. 8-277591

[51] Int. Cl.⁶ ...................................................... C08K 3/34
[52] U.S. Cl. .............................................. 524/451; 525/89
[58] Field of Search ................................ 524/451; 525/89

[56] References Cited

U.S. PATENT DOCUMENTS

| | | | |
|---|---|---|---|
| 5,240,973 | 8/1993 | Katoh | 525/68 |
| 5,256,734 | 10/1993 | Sugihara | 252/89 |
| 5,354,618 | 10/1994 | Ishigaki | 525/79 |
| 5,432,209 | 7/1995 | Sobajima | 525/89 |
| 5,674,930 | 10/1997 | Sugiura | 525/85 |

FOREIGN PATENT DOCUMENTS 6-145440  5/1994  Japan .

*Primary Examiner*—Paul R. Michl
*Attorney, Agent, or Firm*—Sughrue, Mion, Zinn, Macpeak & Seas, PLLC

[57] ABSTRACT

A resin composition comprising: (A) a polypropylene polymer comprising a propylene/ethylene block copolymer, said polypropylene polymer having a melt flow rate of from 5 to 100 g/10 min as measured at 230° C. under a load of 2.16 kg and containing components extractable with xylene at 20° C., wherein the xylene-extractable components having an intrinsic viscosity as measured at 140° C. in decalin of from 2.0 to 5.0 g/dl; (B) an ethylene/propylene rubber having a propylene content of from 40 to 60% by weight and a melt flow rate of from 0.5 to 10 g/10 min as measured at 230° C. under a load of 2.16 kg; (C) a triblock copolymer having a melt flow rate of from more than 40 to 200 g/10 min as measured at 230° C. under a load of 2.16 kg, a flat interface between said triblock copolymer and the 100° C. xylene-insoluble components of said polypropylene polymer of ingredient (A) having a critical energy release rate of 20 J/m² or higher as measured at a phase angle of from −2° to −12°; (D) a modified polyolefin polymer having a hydroxy group, said modified polyolefin polymer having a content of a hydroxy-containing unsaturated compound of from 0.5 to 7.0% by weight; (E) an oligomer having at least one terminal polar group, said oligomer having a number-average molecular weight of from 300 to 10,000; and (F) talc having an average particle diameter of 5 μm or smaller.

9 Claims, No Drawings

RESIN COMPOSITION AND MOLDED OBJECT THEREOF

FIELD OF THE INVENTION

The present invention relates to a resin composition which is excellent in impact resistance and paintability and inhibited from suffering a decrease in impact strength caused by painting, and which is suitable for use as a material for, for example, automotive bumpers and interior or exterior automotive parts.

BACKGROUND OF THE INVENTION

Polymer blending techniques have been reported for improving the impact resistance of materials for automotive bumpers or for interior or exterior automotive parts. For example, a propylene polymer such as a propylene homopolymer, propylene/ethylene block copolymer or propylene random copolymer is blended with an ethylene/propylene copolymer (see JP-A-57-55952; the term "JP-A" as used herein means an "unexamined published Japanese patent application"), an ethylene/α-olefin copolymer (see JP-A-4-372637, JP-A-5-331348, JP-A-6-192500, and JP-A-6-192506), a hydrogenated styrene/diene block copolymer (see JP-A-7-53842), or the like.

A generally employed method for imparting paintability to those compositions is to add an EPR (ethylen-propylene rubber) having an extremely low molecular weight. Besides this, other techniques have been proposed which include a technique comprising adding a polyolefin modified with a compound having a polar group (see JP-A-6-157838), in particular, adding a polyolefin modified with an unsaturated compound having a hydroxy group (see JP-A-5-39383), and a technique comprising adding an oligomer having a terminal polar group (see JP-A-3-157168, JP-A-5-117458, and JP-A-5-320442).

However, materials produced using the above-described techniques are disadvantageous in that an EPR having an extremely low molecular weight or a chemically modified compound as described above should be added in a large amount in order to form a coating film having sufficient solvent resistance, and the incorporation thereof tends to significantly reduce impact resistance and other mechanical properties.

Furthermore, even if a material having a good balance between paintability and impact resistance is obtained with any of those conventional techniques, such a material has a drawback that its impact resistance, especially DuPont impact strength, is reduced by painting.

In the case of exterior automotive parts, in particular, a high degree of paintability is required so that the coated parts can withstand contacts with organic solvents, e.g., gasoline.

SUMMARY OF THE INVENTION

The present invention has been achieved in order to eliminate the above described problems in conventional techniques.

Accordingly, an object of the present invention is to provide a molding which is excellent in impact resistance and paintability and is inhibited from suffering a decrease in impact strength caused by painting.

Another object of the present invention is to provide a resin composition for producing the molding.

Other objects and effects of the present invention will be apparent from the following description.

The above described objects of the present invention have been achieved by providing a resin composition comprising:
  ingredient (A): a polypropylene polymer comprising a propylene/ethylene block copolymer;
  ingredient (B): an ethylene/propylene rubber;
  ingredient (C): a triblock copolymer;
  ingredient (D): a modified polyolefin polymer having a hydroxy group;
  ingredient (E): an oligomer having at least one terminal polar group; and
  ingredient (F): talc,
    said polypropylene polymer of ingredient (A), which comprises a propylene/ethylene block copolymer, having a melt flow rate of from 5 to 100 g/10 min as measured at 230° C. under a load of 2.16 kg and containing components extractable with xylene at 20° C., the xylene-extractable components having an intrinsic viscosity as measured at 140° C. in decalin of from 2.0 to 5.0 g/dl,
    said ethylene/propylene rubber of ingredient (B) having a propylene content of from 40 to 60% by weight and a melt flow rate of from 0.5 to 10 g/10 min as measured at 230° C. under a load of 2.16 kg,
    said triblock copolymer of ingredient (C) having a melt flow rate of from more than 40 to 200 g/10 min as measured at 230° C. under a load of 2.16 kg, a flat interface between said triblock copolymer and the 100° C. xylene-insoluble components of said polypropylene polymer of ingredient (A) having a critical energy release rate of 20 JIm$^2$ or higher as measured at a phase angle of from −2° to −120, the proportion of ingredient (C) to the sum of ingredients (A), (B), (C), (D), (E) and (F) being from 2 to 10% by weight,
    said modified polyolefin polymer of ingredient (D), which has a hydroxy group, having a content of a hydroxy-containing unsaturated compound of from 0.5 to 7.0% by weight, the proportion of ingredient (D) to the sum of ingredients (A), (B), (C), (D), (E) and (F) being from 0.5 to 40% by weight,
    said oligomer of ingredient (E), which has at least one terminal polar group, having a number-average molecular weight of from 300 to 10,000, the proportion of ingredient (E) to the sum of ingredients (A), (B), (C), (D), (E) and (F) being from 0.5 to 10% by weight, and
    said talc of ingredient (F) having an average particle diameter of 5 μm or smaller, the proportion of ingredient (F) to the sum of ingredients (A), (B), (C), (D), (E) and (F) being from 5 to 25% by weight.
  In this resin composition, ingredient (C) is preferably a hydrogenated styrene/butadiene/styrene triblock copolymer or a hydrogenated styrene/isoprene/styrene triblock copolymer each having a styrene content of from 12 to 35% by weight.

Ingredient (E) is preferably a hydrogenated butadiene oligomer having at least one terminal hydroxy group.

The present invention further relates to a molding comprising the resin composition of the invention and a molding for an automotive part, which comprises the resin composition.

DETAILED DESCRIPTION OF THE INVENTION

Ingredient (A): Polypropylene Polymer

The polypropylene polymer for use in the present invention should comprise at least one propylene/ethylene block copolymer. Namely, the polypropylene polymer in the present invention may be composed of a propylene/ethylene block copolymer alone, or may be composed of a combination of a propylene/ethylene block copolymer and either a propylene random copolymer or a propylene homopolymer (homopolypropylene).

Preferred comonomers for use in the random copolymer include a-olefins other than propylene, such as ethylene, butene-1, hexene-1, octene-1 and 4-methylpentene-1. Especially preferred of these is ethylene.

Ethylene and propylene blocks in the molecules of the block copolymer produced using ethylene as an α-olefin, i.e., the propylene/ethylene block copolymer, are dispersed in a homopolypropylene to thereby serve as a rubber ingredient to contribute to the impartation of impact resistance.

The polypropylene polymer has a melt flow rate (as measured in accordance with JIS K7210, conditions 14; hereinafter referred to as MFR) of from 5 to 100 g/10 min, preferably from 15 to 50 g/10 min. If a polypropylene polymer having an MFR lower than 5 g/10 min is used, the resin composition obtained has poor fluidity and impaired moldability and, in particular, gives a molding having severe flow marks. On the other hand, if a polypropylene polymer having an MFR exceeding 100 g/10 min is used, the resin composition obtained tends to have impaired impact resistance and reduced paintability.

The polypropylene polymer for use in the present invention can be obtained from a polypropylene polymer having a low MFR (e.g., 0.5 g/10 min) by melt-mixing the polymer in the presence of an organic peroxide (visbreaking) to thereby regulate the MFR to a value within the range specified above.

In the polypropylene polymer, the content of components extractable with xylene at 20° C. is preferably from 15 to 60% by weight, more preferably from 25 to 50% by weight. These components correspond to a rubber ingredient. If the content of components extractable with xylene at 20° C. in the polypropylene polymer is lower than 15% by weight, it is necessary to further add a large amount of a rubber ingredient to the composition in order to impart sufficient impact resistance and this leads to problems, e.g., a cost increase and dispersion failure. On the other hand, if the content thereof exceeds 60% by weight, such a polypropylene polymer is so tacky that the production thereof tends to have troubles.

The 20° C. xylene-extractable components of the polypropylene polymer preferably have a propylene content of from 40 to 60% by weight, more preferably from 45 to 58% by weight. If the propylene content in the xylene-extractable components is lower than 40% by weight, the resin composition obtained is less apt to have sufficient impact resistance. If the propylene content therein exceeds 60% by weight, heat resistance and surface hardness are reduced.

The 20° C. xylene-extractable components of the polypropylene polymer have an intrinsic viscosity as measured at 140° C. in decalin of from 2.0 to 5.0 g/dl, preferably from 2.0 to 3.5 g/dl. If the intrinsic viscosity thereof is lower than 2.0 g/dl, the resin composition obtained does not have sufficient impact resistance. If the intrinsic viscosity thereof exceeds 5.0 g/dl, not only the resin composition obtained has poor paintability but also use of the polypropylene polymer tends to result in poor dispersion and reduced impact resistance.

The proportion of the polypropylene polymer of ingredient (A) to the sum of ingredients (A), (B), (C), (D), (E) and (F) is preferably from 30 to 85% by weight, more preferably from 40 to 85% by weight, particularly preferably from 45 to 80% by weight. If the content of ingredient (A) is lower than 30% by weight, it is necessary to further add a large amount of a rubber to the composition, resulting in a cost increase. If the content thereof exceeds 85% by weight, the resin composition obtained tends to have poor paintability.

Ingredient (B): Ethylene/Propylene Rubber

The ethylene/propylene rubber for use in the present invention has a propylene content of from 40 to 60% by weight. If an ethylene/propylene rubber having a propylene content lower than 40% by weight is used, the resin composition obtained is less apt to have sufficient low-temperature impact resistance. If an ethylene/propylene rubber having a propylene content exceeding 60% by weight is used, the rigidity, heat resistance and surface hardness of the resin composition are reduced.

The ethylene/propylene rubber has an MFR as measured at 230° C. under a load of 2.16 kg of from 0.5 to 10 g/10 min, preferably from 0.7 to 8 g/10 min. If an ethylene/propylene rubber having an MFR lower than 0.5 g/10 min is used, the resin composition obtained has dispersion failure and gives a molding having an impaired surface appearance and reduced mechanical performances. If an ethylene/propylene rubber having an MFR exceeding 10 g/10 min is used, the resin composition obtained is less apt to have sufficient impact resistance.

The proportion of the ethylene/propylene rubber of ingredient (B) to the sum of ingredients (A), (B), (C), (D), (E) and (F) is preferably from 5 to 40% by weight. If the content of ingredient (B) is lower than 5% by weight, impact resistance and paintability are reduced. If the content thereof exceeds 40% by weight, an increased cost results.

The ethylene/propylene rubber can be produced using a titanium, vanadium or metallocene catalyst.

Ingredient (C): Triblock Copolymer

The triblock copolymer for use in the present invention has an effect of improving DuPont impact strength after painting.

The triblock copolymer has an MFR of from more than 40 to 200 g/10 min, preferably from more than 40 to 180 g/10 min, as measured at 230° C. under a load of 2.16 kg. If a triblock copolymer having an MFR of 40 g/10 min or lower is used, the resin composition obtained has a significantly reduced DuPont impact strength after painting. If a triblock copolymer having an MFR exceeding 200 g/10 min is used, impact resistance, tensile elongation, and other properties are reduced.

A flat interface between this triblock copolymer and the 100° C. xylene-insoluble components of the propylene/ethylene block copolymer of ingredient (A) has a critical energy release rate (hereinafter referred to as "Gc") of 20 J/m$^2$ or higher, preferably 30 J/m$^2$ or higher, more preferably from 40 to 100 J/m$^2$, as measured at a phase angle of from −2° to −12°. If the Gc of the interface is lower than 20 J/m$^2$, the resin composition obtained is reduced in impact resistance and other properties.

The proportion of the triblock copolymer of ingredient (C) to the sum of ingredients (A), (B), (C), (D), (E) and (F) is from 2 to 10% by weight, preferably from 2 to 5% by weight. If the content of the triblock copolymer in the resin composition is lower than 2% by weight, the composition has a considerably reduced DuPont impact strength after painting. If the content thereof exceeds 10% by weight, there is a problem that the resin composition has an increased cost, and improvements in properties are not expected for the cost.

The triblock copolymer is preferably a hydrogenated styrene/butadiene/styrene triblock copolymer (hereinafter referred to as "SEBS") having a styrene content of from 12 to 35% by weight. If an SEBS having a styrene content lower than 12% by weight is used, impact resistance and heat resistance are apt to be reduced. On the other hand, use of an SEBS having a styrene content exceeding 35% by weight also tends to result in reduced impact resistance.

The triblock copolymer is also preferably a hydrogenated styrene/isoprene/styrene triblock copolymer (hereinafter referred to as "SEPS") having a styrene content of from 12 to 35% by weight. If an SEPS having a styrene content lower than 12% by weight is used, impact resistance and heat resistance are apt to be reduced. On the other hand, use of an SEPS having a styrene content exceeding 35% by weight also tends to result in reduced impact resistance.

These triblock copolymers can be produced by the generally employed anionic living polymerization process. This process can be carried out, for example, by a method comprising successively polymerizing styrene, butadiene and styrene to produce a triblock copolymer and then hydrogenating the copolymer, or by a method comprising firstly producing a styrene/butadiene diblock copolymer, converting the diblock copolymer to a triblock copolymer using a coupling agent, and then hydrogenating the triblock copolymer, or by a method comprising successively polymerizing butadiene and styrene using a bifunctional initiator and then hydrogenating the copolymer. Whichever method is used, the process also yields a certain amount of diblock copolymer, homopolymer, etc. However, the content of these by-product polymers should be lower than 10% by weight based on the whole triblock copolymer. If the content of the diblock copolymer and homopolymer exceeds 10% by weight, rigidity is reduced.

Ingredient (D): Modified Polyolefin Polymer Having Hydroxy Group

The modified polyolefin polymer having a hydroxy group for use in the present invention has an effect of improving paintability.

This modified polyolefin polymer having a hydroxy group is preferably a polymer obtained by reacting polyethylene, polypropylene or an ethylene/α-olefin copolymer at an elevated temperature in the presence of an organic peroxide and an unsaturated compound having a hydroxy group.

Examples of the organic peroxide for use in producing the modified polyolefin polymer include benzoyl peroxide, lauroyl peroxide, azobisisobutyronitrile, dicumyl peroxide, α, α'-bis(t-butylperoxydiisopropyl)benzene, 2,5-dimethyl-2,5-di(t-butylperoxy)hexane, cumene hydroperoxide and t-butyl hydroperoxide.

Examples of the hydroxy-containing unsaturated compound for use in producing the modified polyolefin polymer include hydroxyethyl acrylate, hydroxyethyl methacrylate, hydroxypropyl acrylate and hydroxypropyl methacrylate.

The content of the hydroxy-containing unsaturated compound in ingredient (D) is preferably from 0.5 to 7.0% by weight, more preferably from 0.5 to 4.0% by weight. Contents lower than 0.5% by weight are undesirable in that it is difficult to impart sufficient paintability. If the content thereof exceeds 7.0% by weight, impact resistance, rigidity and other properties are reduced.

The proportion of the modified polyolefin polymer of ingredient (D), which has hydroxy groups, to the sum of ingredients (A), (B), (C), (D), (E) and (F) is from 0.5 to 40% by weight. Contents of ingredient (D) lower than 0.5% by weight are undesirable in that it is difficult to impart sufficient paintability. If the content thereof exceeds 40% by weight, impact resistance, rigidity and other properties are reduced.

Ingredient E: Oligomer Having Terminal Polar Group

The oligomer having at least one terminal polar group for use in the present invention has an effect of improving paintability.

The oligomer is in a liquid rubber or wax-like solid state, and has at least one terminal functional group per its molecule. Examples of the functional group include hydroxy, amino, carboxyl, epoxy, thiol and maleic anhydride groups. The oligomer may contain two or more kinds of functional groups as long as these groups do not react with each other.

The oligomer has a number-average molecular weight of from 300 to 10,000, preferably from 500 to 8,000, most preferably from 500 to 6,000. Use of an oligomer having a number-average molecular weight lower than 300 is undesirable in that the resin composition obtained has reduced rigidity and impaired impact resistance. If an oligomer having a number-average molecular weight exceeding 10,000 is used, paintability is impaired.

Examples of the oligomer include polybutadiene, polyisoprene, isobutylene/isoprene copolymers (butyl rubber), polybutene, butadiene/acrylonitrile copolymers, petroleum resins, and partial or complete hydrogenation products obtained from these, provided that each of these oligomers has at least one terminal functional group per molecule.

These oligomers can be produced by known methods. Commercial products of these oligomers include hydroxy-terminated hydrogenated 1,4-polybutadienes (trade names: Polytail H, Polytale HA; manufactured by Mitsubishi Chemical Corp., Japan), a hydroxy-terminated hydrogenated polyolefin (trade name: Epol; manufactured by Idemitsu Petrochemical Co., Ltd., Japan), hydroxy-terminated 1,2-polybutadienes (trade names: NISSO-PB G-1000, NISSO-PB GI-1000; manufactured by Nippon Soda Co., Ltd., Japan), an amino-terminated acrylonitrile/butadiene rubber (trade name: Hycar-ATBN; manufactured by Ube Industries, Ltd., Japan), and an amino-terminated polyethylene glycol (trade name: Jefamine; manufactured by Texaco Chemical Corp.). These oligomers are easily available and can be advantageously used.

The oligomer of ingredient (E) is incorporated in an amount of from 0.5 to 10% by weight based on the sum of ingredients (A), (B), (C), (D), (E) and (F). If the content of ingredient (E) is lower than 0.5% by weight, the resin composition obtained does not have sufficient paintability. Contents thereof exceeding 10% by weight are undesirable in that rigidity is reduced.

Ingredient (F): Talc

The talc for use in the present invention has an average particle diameter of 5 μm or smaller. If the average particle diameter thereof exceeds 5 μm, impact resistance, tensile elongation and other properties are reduced.

The proportion of the talc of ingredient (F) to the sum of ingredients (A), (B), (C), (D), (E) and (F) is from 5 to 25% by weight. If the proportion thereof is outside the above range, it is difficult to satisfy the properties required of an automotive part material, including modulus and impact resistance.

Measurement Method for Gc

In the present invention, Gc is defined as the critical energy release rate of a crack present at a flat interface between the triblock copolymer and the 100° C. xylene-insoluble components of the propylene/ethylene block copolymer. For measuring Gc, the asymmetric double cantilever beam method (hereinafter referred to as "ADCB method"; see Costantino Kreton, thesis for degree, Cornell University, 1992) is used. This is because the ADCB method is effective in growing a crack along the interface. In the peel test which has been used conventionally, a crack cannot grow along the interface and hence the crack tends to propagate into the more compliant material (i.e., the triblock copolymer). Hence, this conventional method cannot be used for accurately measuring the Gc of the interface.

The parameter which determines the direction of crack growth is the phase angle $\phi$ defined by the equation:

$$\phi = \tan^{-1}(K_{II}/K_I)$$

wherein $K_I$ and $K_{II}$, are the stress intensity factors corresponding to mode I (tensile) and mode II (inplane shear), respectively. T depends on the geometry of the ADCB method, the moduli of the individual materials, Poisson's ratio and crack length. Virtually, the boundary element method (BEM) and the finite element method (FEM) are used for the evaluation.

In carrying out the measurement of Gc in the present invention, $\phi$ should be in the range of from $-2°$ to $-12°$. When a crack propagates toward the thinner beam, the value of $\phi$ is defined as negative. If the $\phi$ is smaller than $-12°$, there is a problem that a crack generated at the interface propagates into the thinner beam, making it impossible to accurately measure the Gc of the interface. On the other hand, if the $\phi$ is in the range of from more than $-2°$ to $0°$, there is a problem that crack growth at the interface is unstable, making it impossible to accurately measure the Gc of the interface as in the above case. Furthermore, if the $\phi$ exceeds $0°$, a crack propagates into the triblock copolymer, making it impossible to accurately measure the Gc of the interface.

In producing the resin composition of the present invention, additives widely used in the field of synthetic resins and synthetic rubbers may be suitably added according to the intended use of the composition of the invention as long as the properties of the composition are not substantially impaired thereby. Examples of the additives include stabilizers for heat, oxygen and light, flame retardants, fillers, colorants, lubricants, plasticizers and antistatic agents.

Examples of the antioxidants include dibutylhydroxytoluene, alkylated phenols, 4,4'-thiobis(6-t-butyl-3-methylphenol), 4,4'-butylidenebis(6-t-butyl-3-methylphenol), 2,2'-methylenebis(4-methyl-6-t-butylphenol), 2,2'-methylenebis(4-ethyl-6-t-butylphenol), 2,6-di-t-butyl-4-ethylphenol, 1,1,3-tris(2-methyl-4-hydroxy-5-t-butylphenyl)butane, n-octadecyl 3-(4-hydroxy-3,5-di-t-butylphenyl)propionate, tetrakis[methylene-3-(3,5-di-t-butyl-4 -hydroxyphenyl)propionate]methane, dilauryl thiodipropionate, distearyl thiodipropionate, and dimyristylyl thiopropionate. Examples thereof further include hindered phenol antioxidants such as triethylene glycol bis[3-(3-t-butyl-5-methyl-4-hydroxyphenyl)propionate], 1,6-hexanediol bis[3-(3,5-di-t-butyl-4-hydroxyphenyl) propionate], 2,4-bis(n-octylthio)-6-(4-hydroxy-3,5-di-t-butylanilino)-1,3,5-triazine, pentaerythryl tetrakis[3-(3,5-di-t-butyl-4-hydroxyphenyl)propionate], 2,2-thiodiethylenebis [3-(3,5-di-t-butyl-4-hydroxyphenyl)propionate], octadecyl 3-(3,5-di-t-butyl-4-hydroxyphenyl)propionate], N,N'-hexamethylenebis(3,5-di-t-butyl-4-hydroxyhydrocinnamide), diethyl 3,5-di-t-butyl-4-hydroxybenzylphosphonate, 1,3,5-trimethyl-2,4,6-tris(3,5-di-t-butyl-4-hydroxybenzyl)benzene, tris(3,5-di-t-butyl-4-hydroxybenzyl isocyanurate, octyldiphenylamines, and 2,4-bis[(octylthio)methyl]-o-cresol; and hydrazine antioxidants such as N,N'-bis[3-(3,5-di-t-butyl-4-hydroxyphenyl) propionyl]hydrazine. Also usable besides the above-enumerated antioxidants are phenolic antioxidants, phosphite antioxidants, thioether antioxidants, and heavy metal deactivators.

Examples of usable ultraviolet absorbers include 2-(2'-hydroxy-5'-methylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-hydroxy-4-n-octoxybenzophenone, phenyl salicylate, 2-(5-methyl-2-hydroxyphenyl)benzotriazole, 2-[2-hydroxy-3,5-bis($\alpha$,$\alpha$-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-(2'-hydroxy-5'-t-octylphenyl)benzotriazole, and hydroxyphenylbenzotriazole derivatives. Examples thereof further include dimethyl succinate/1-(2-hydroxyethyl)-4-hydroxy-2,2,6,6-tetramethylpiperidine polycondensates, poly{[6-(1,1,3,3-tetramethylbutyl)amino-1,3,5-triazine-2,4-diyl][(2,2,6,6-tetramethyl-4-piperidyl)imino]hexamethylene[(2,2,6,6-tetramethyl-4-piperidyl)imino]}, N,N'-bis(3-aminopropyl) ethylenediamine/2,4-bis[N-butyl-N-(1,2,2,6,6-pentamethyl-4-piperidyl)amino]-6-chloro-1,3,5-triazine condensates, bis (2,2,6,6-tetramethyl-4-piperidyl) sebacate, bis(1,2,2,6,6-pentamethyl-4-piperidyl) 2-(3,5-di-t-butyl-4-hydroxybenzyl)-2-n-butylmalonate, and 2,4-di-t-butylphenyl-3,5-butyl 4-hydroxybenzoate.

Usable examples of the flame retardants include polybromodiphenyl oxides, tetrabromobisphenol A, brominated epoxyhexabromocyclododecanes, ethylenebistetrabromophthalimide, brominated polystyrene, Dechlorane, brominated polycarbonates, polyphosphonate compounds, halogenated polyphosphonates, triazine, red phosphorus, tricresyl phosphate, triphenyl phosphate, crediphenyl phosphate, triallyl phosphate, trixylyl phosphate, trialkyl phosphates, trischloroethyl phosphate, trischloropropyl phosphate, tris(dichloropropyl) phosphate, antimony trioxide, aluminum hydroxide, and magnesium hydroxide. Other usable additives include silicone oils, stearic acid, calcium stearate, barium stearate, aluminum stearate, zinc stearate, magnesium stearate, carbon black, titanium dioxide, silica, mica, and montmorillonite.

Besides the additives described above, an inorganic filler may be added. Examples of the inorganic filler include fibrous fillers such as barium titanate whiskers, calcium carbonate whiskers, magnesium sulfate whiskers, boron whiskers, carbon fibers and glass fibers, and particulate fillers such as calcium carbonate and magnesium carbonate.

Production Methods

The resin composition of the present invention is produced by homogeneously mixing the ingredients described above together with additives and other optional ingredients. For this mixing, methods generally employed in the field of synthetic resins may be used without particular limitations. Examples thereof include commonly used methods for dry-blending using a mixing machine such as a Henschel mixer, tumbler or ribbon mixer and commonly used melt-mixing method using a mixing machine such as an open-roll mill, extruder, kneader, or Banbury mixer.

A resin composition having further better homogeneity can be obtained by using a combination of two or more of those mixing techniques. For example, the ingredients are dry-blended with one another beforehand and the mixture is melt-mixed. Even in the case where dry blending is conducted beforehand or two or more melt-mixing techniques are used in combination, the mixture obtained is especially preferably pelleted with a pelletizer before being molded by any of the molding methods described later.

The melt-mixing method among the mixing methods described above and any of the molding methods described below should be conducted at a temperature at which each resin used melts. However, since the resins may be pyrolyzed or deteriorated at too high temperatures, the melt-mixing and the molding are carried out generally at 180° to 350° C., preferably at 190° to 260° C.

The resin composition of the present invention may be molded into a desired shape by a molding method generally employed in the field of synthetic resins, e.g., injection molding, extrusion molding, compression molding or blow molding. The composition may be molded into a sheet with an extruder and then into a desired shape by a secondary processing such as vacuum forming or air-pressure forming.

Examples of the molding made of the resin composition of the present invention include automotive parts and parts of domestic electrical appliances. Particularly, the resin composition of the present invention is more suitable for automotive parts such as automotive bumpers and interior or exterior automotive parts.

The present invention will be described in more detail below by reference to the following Examples, but the invention should not be construed as being limited thereto.

EXAMPLE

Various resin compositions were produced using the polypropylene polymers (A), ethylene/propylene rubbers (B), triblock copolymers (C), modified polyolefin polymers having hydroxy groups (D), oligomers having at least one terminal polar group (E) and talc powders (F) as shown in Tables 1 to 6.

The seven kinds of propylene/ethylene copolymers shown in Table 1 were used as the polypropylene polymer (A).

TABLE 1

| Propylene/ethylene block copolymer (A) | | | |
|---|---|---|---|
| MFR (g/10 min) | [η]E/P (dl/g) | Fp (wt %) | CE/P (wt %) |
| PP-1 | 30 | 2.8 | 50 | 20 |
| PP-2 | 30 | 2.2 | 50 | 20 |
| PP-3 | 30 | 3.2 | 50 | 36 |
| PP-4 | 30 | 1.6 | 50 | 20 |
| PP-5 | 20 | 5.5 | 50 | 20 |
| PP-6 | 1 | 2.8 | 50 | 20 |
| PP-7 | 105 | 2.2 | 50 | 20 |

MFR given in Table 1 was determined in accordance with JIS K7210, conditions 14 at 230° C. under a load of 2.16 kg. CE/P for each propylene/ethylene block copolymer is the amount of the components thereof extractable with xylene at 20° C. Fp is the propylene content in the extracted components as determined by NMR. [η]E/P is the intrinsic viscosity of the xylene-extractable components as measured at 140° C. in decalin.

TABLE 2

| Ethylene/propylene rubber (B) | | |
|---|---|---|
| | MFR (g/10 min) | Fp (wt %) |
| EPR-1 | 2 | 32 |
| EPR-2 | 5 | 32 |
| EPR-3 | 0.4 | 32 |
| EPR-4 | 18 | 32 |
| EPR-5 | 2 | 20 |
| EPR-6 | 2 | 65 |

Fp (wt %) in Table 2 is the propylene content as determined by NMR.

TABLE 3

| Triblock copolymer (C) | | | |
|---|---|---|---|
| | Kind | MFR (g/10 min) | Fs (wt %) |
| TB-1 | SEBS | 41 | 20 |
| TB-2 | SEBS | 130 | 30 |
| TB-3 | SEPS | 70 | 30 |
| TB-4 | SEBS | 10 | 20 |
| TB-5 | SEBS | 300 | 30 |
| TB-6 | SEBS | 41 | 10 |
| TB-7 | SEBS | 41 | 40 |
| TB-8 | SEBS | 41 | 20 |

With respect to the kind of triblock copolymer in Table 3, a hydrogenated styrene/butadiene/styrene triblock copolymer is indicated by SEBS, while a hydrogenated styrene/isoprene/styrene triblock copolymer is indicated by SEPS. The styrene content (wt %) of each copolymer determined by NMR is shown under Fs.

The critical energy release rate (Gc (J/m$^2$)) of a flat interface between a triblock copolymer shown in Table 3 and the 100° C. xylene-insoluble components of a propylene/ethylene block copolymer (A) was determined by the asymmetric double cantilever beam method described in JP-A-7-286088 and JP-A-7-292175, as follows. The triblock copolymer and the 100° C. xylene-insoluble components of the propylene/ethylene block copolymer (A) were separately press-molded into a sheet having a thickness of about 1 mm. The two sheets were superposed on each other and then pressed with a press molding machine at 200° C. for 10 minutes to heat-bond the sheets to each other. Thereafter, a crack was formed at the resultant interface with a razor blade having a thickness of 0.25 mm, and the critical energy release rate was determined by the ADCB method in which φ was regulated to −7° C. based on the ratio of the thickness of one beam to that of the other calculated by the boundary element method. The values of Gc for the respective resin compositions are shown in Tables 7 to 10. TB-8 is a triblock copolymer having a butene content in the butadiene block thereof lower than that of TB-1.

Modified Polyolefin Polymer with Hydroxy Group (D):

A modified polyolefin polymer having hydroxy groups, ingredient (D), was obtained by dry-blending 100 parts by weight of a homopolypropylene having an MFR of 0.5 g/10 min with 3 parts by weight of 2-hydroxyethyl methacrylate (referred to as HEMA) and 1 part by weight of 2,5-bis(t-butylperoxy)-2,5-dimethylhexane by means of a Henschel mixer, and then kneading the mixture with a 20-mm corotating twin-screw extruder at 180° C. to modify the polymer. The hydroxy group content of the modified polypropylene obtained was determined by infrared spectrometry, and was found to be 0.09 mmol/g. The weight-average molecular weight thereof was measured by GPC (gel permeation chromatography), and was found to be 110,000.

Another modified polyolefin polymer was produced in the same manner as the above, except that the comonomer was replaced with hydroxybutyl acrylate (referred to as HBA). This polymer was also used.

Furthermore, still another one was produced using HEMA in a different amount. These modified polymers are referred to as UK, and summarized in Table 4.

TABLE 4

|      | MFR (g/10 min) | Monomer | Monomer amount |
|------|----------------|---------|----------------|
| UK-1 | 200            | HEMA    | 3              |
| UK-2 | 200            | HBA     | 3              |
| UK-3 | 200            | HEMA    | 0.3            |

Oligomer Having Terminal Polar Group (E):

The oligomers having at least one terminal polar group used as ingredient (E) were a wax-like hydroxy-terminated hydrogenated 1,4-polybutadiene (1,4-bond content, 80%; number-average molecular weight, 2,800; iodine value, 1.5; average number of hydroxy groups per molecule, 2.3; melting point, 72.5° C.) (EF-1), and EF-2 and EF-3 which both had different number-average molecular weights ($M_n$) as shown in Table 5.

TABLE 5

|      | Number-average molecular weight ($M_n$) |
|------|------------------------------------------|
| EF-1 | 2800                                     |
| EF-2 | 100                                      |
| EF-3 | 12000                                    |

TABLE 6

| Talc (F) | |
|---|---|
| | Particle diameter ($\mu$m) |
| T-1 | 2 |
| T-2 | 5.6 |

The particle diameter of each talc powder of ingredient (F) was measured by the laser sedimentation method.

The ingredients (A) to (F) described above were blended according to the formulations shown in the Formulation Tables of Tables 7 to 10 shown below.

After 3-minute dry-blending by means of a Henschel mixer, each resultant mixture was kneaded with a corotating twin-screw extruder (diameter, 30 mm) set at 210° C. to produce pellets of a resin composition. Each pelleted resin composition obtained was molded with an injection molding machine set at 210° C. to produce test pieces, which were subjected to the following property examinations. The results obtained are shown in Property Tables in Tables 7 to 10 below.

Property examinations were made by the following methods.

(1) Flexural Modulus (FM) Test:

Test pieces formed by injection molding were tested at 23° C. in accordance with ASTM D790. The crosshead speed used was 30 mm/min.

(2) IZOD Impact Strength Test:

Notched test pieces formed by injection molding were tested at −30° C. in accordance with ASTM D256.

(3) Paintability Test:

First, test pieces formed by the injection molding described above (flat plates having dimensions of 130 mm×130 mm×3 mm) were washed with ion-exchanged water and dried. The test pieces were then directly painted with a two-pack urethane paint (coating thickness: 30 $\mu$m), and the coating was baked at 80° C. for 40 minutes.

The painted samples were cut into strips having the same sections. The strips were immersed in a 20° C. gasoline/ethanol (90/10 by volume) mixture, and the time (min) required for each to peel off was measured.

(4) DuPont Impact Strength Test:

Test pieces for the DuPont impact strength measurement (flat plates having dimensions of 130 mm×130 mm ×3 mm) were formed by the injection molding described above. These test pieces were examined for impact strength before painting and after painting at −30° C. in accordance with ASTM D3029. The unit of the strength is kgf·cm. The painting was conducted by directly applying a two-pack urethane paint in a thickness of 30 $\mu$m and baking the resultant painting at 80° C. for 40 minutes.

TABLE 7

| | \multicolumn{6}{c}{Formulation Table} |
|---|---|---|---|---|---|---|
| | (A) | (B) | (C) | (D) | (E) | (F) |
| Ex. 1 | PP-1: 33 | EP-1: 24 | TB-1: 5 | UK-1: 25 | EF-1: 3 | T-1: 10 |
| Ex. 2 | PP-2: 33 | EP-1: 24 | TB-1: 5 | UK-1: 25 | EF-1: 3 | T-1: 10 |
| Ex. 3 | PP-3: 40 | EP-1: 17 | TB-1: 5 | UK-1: 25 | EF-1: 3 | T-1: 10 |
| Comp. Ex. 1 | PP-4: 33 | EP-1: 24 | TB-1: 5 | UK-1: 25 | EF-1: 3 | T-1: 10 |
| Coap. Ex. 2 | PP-5: 33 | EP-1: 24 | TB-1: 5 | UK-1: 25 | EF-1: 3 | T-1: 10 |
| Comp. Ex. 3 | PP-6: 33 | EP-1: 24 | TB-1: 5 | UK-1: 25 | EF-1: 3 | T-1: 10 |
| Comp. Ex. 4 | PP-7: 33 | EP-1: 24 | TB-1: 5 | UK-1: 25 | EF-1: 3 | T-1: 10 |

| | \multicolumn{6}{c}{Property Table} |
|---|---|---|---|---|---|---|
| | Gc | FM | IZOD | Paintability | \multicolumn{2}{c}{DuPont impact strength (kgf.cm)} |
| | (J/m²) | (kgf/cm²) | (kgf.cm/cm) | (min) | before painting | after painting |
| Ex. 1 | 65 | 10000 | 6.8 | >120 | >300 | 250 |
| Ex. 2 | 75 | 10000 | 6.0 | >120 | >300 | 230 |
| Ex. 3 | 45 | 10000 | 7.2 | >120 | >300 | 250 |
| Comp. Ex. 1 | 80 | 10000 | 4.7 | >120 | 280 | 200 |
| Comp. Ex. 2 | 40 | 10000 | 5.0 | 100 | 200 | 120 |
| Comp. Ex. 3 | 280 | 8000 | 8.5 | >120 | >300 | 200 |
| Comp. Ex. 4 | 40 | 10000 | 4.8 | >120 | 200 | 120 |

TABLE 8

Formulation Table

|  | (A) | (B) | (C) | (D) | (E) | (F) |
|---|---|---|---|---|---|---|
| Ex. 4 | PP-1: 33 | EP-2: 24 | TB-1: 5 | UK-1: 25 | EF-1: 3 | T-1: 10 |
| Comp. Ex. 5 | PP-1: 33 | EP-3: 24 | TB-1: 5 | UK-1: 25 | EF-1: 3 | T-1: 10 |
| Comp. Ex. 6 | PP-1: 33 | EP-4: 24 | TB-1: 5 | UK-1: 25 | EF-1: 3 | T-1: 10 |
| Comp. Ex. 7 | PP-1: 33 | EP-5: 24 | TB-1: 5 | UK-1: 25 | EF-1: 3 | T-1: 10 |
| Comp. Ex. 8 | PP-1: 33 | EP-6: 24 | TB-1: 5 | UK-1: 25 | EF-1: 3 | T-1: 10 |

Property Table

|  | Gc ($J/m^2$) | FM ($kgf/cm^2$) | IZOD (kgf.cm/cm) | Paintability (min) | DuPont impact strength (kgf.cm) before painting | DuPont impact strength (kgf.cm) after painting |
|---|---|---|---|---|---|---|
| Ex. 4 | 65 | 10000 | 6.2 | >120 | >300 | >300 |
| Comp. Ex. 5 | 65 | 10000 | 7.0 | >120 | 200 | 80 |
| Comp. Ex. 6 | 65 | 10000 | 4.8 | 60 | 250 | 100 |
| Comp. Ex. 7 | 65 | 11000 | 5.0 | >120 | 270 | 80 |
| Comp. Ex. 8 | 65 | 7000 | 6.5 | >120 | >300 | >300 |

TABLE 9

Formulation Table

|  | (A) | (B) | (C) | (D) | (E) | (F) |
|---|---|---|---|---|---|---|
| Ex. 5 | PP-1: 33 | EP-1: 24 | TB-2: 5 | UK-1: 25 | EF-1: 3 | T-1: 10 |
| Ex. 6 | PP-1: 33 | EP-1: 24 | TB-3: 5 | UK-1: 25 | EF-1: 3 | T-1: 10 |
| Comp. Ex. 9 | PP-1: 33 | EP-1: 24 | TB-4: 5 | UK-1: 25 | EF-1: 3 | T-1: 10 |
| Comp. Ex. 10 | PP-1: 33 | EP-1: 24 | TB-5: 5 | UK-1: 25 | EF-1: 3 | T-1: 10 |
| Ex. 7 | PP-1: 33 | EP-1: 24 | TB-6: 5 | UK-1: 25 | EF-1: 3 | T-1: 10 |
| Ex. 8 | PP-1: 33 | EP-1: 24 | TB-7: 5 | UK-1: 25 | EF-1: 3 | T-1: 10 |
| Comp. Ex. 11 | PP-1: 33 | EP-1: 24 | TB-8: 5 | UK-1: 25 | EF-1: 3 | T-1: 10 |
| Comp. Ex. 12 | PP-1: 33 | EP-1: 29 | — | UK-1: 25 | EF-1: 3 | T-1: 10 |

Property Table

|  | Gc ($J/m^2$) | FM ($kgf/cm^2$) | IZOD (kgf.cm/cm) | Paintability (min) | DuPont impact strength (kgf.cm) before painting | DuPont impact strength (kgf.cm) after painting |
|---|---|---|---|---|---|---|
| Ex. 5 | 60 | 10000 | 6.3 | >120 | >300 | 250 |
| Ex. 6 | 70 | 10500 | 6.5 | >120 | >300 | 230 |
| Comp. Ex. 9 | 200 | 10500 | 7.0 | >120 | >300 | 120 |
| Comp. Ex. 10 | 15 | 10000 | 4.7 | >120 | 280 | 100 |
| Ex. 7 | 30 | 9000 | 5.2 | >120 | >300 | 220 |
| Ex. 8 | 70 | 11000 | 5.1 | >120 | >300 | 210 |
| Comp. Ex. 11 | 10 | 10500 | 4.5 | >120 | 200 | 100 |
| Comp. Ex. 12 | — | 9500 | 6.0 | >120 | >300 | 85 |

TABLE 10

Formulation Table

|  | (A) | (B) | (C) | (D) | (E) | (F) |
|---|---|---|---|---|---|---|
| Ex. 9 | PP-1: 33 | EP-1: 24 | TB-1: 5 | UK-2: 25 | EF-1: 3 | T-1: 10 |
| Comp. Ex. 13 | PP-1: 33 | EP-1: 24 | TB-1: 5 | UK-3: 25 | EF-1: 3 | T-1: 10 |
| Comp. Ex. 14 | PP-1: 33 | EP-1: 24 | TB-1: 5 | *1) | EF-1: 3 | T-1: 10 |
| Comp. Ex. 15 | PP-1: 33 | EP-1: 24 | TB-1: 5 | UK-1: 25 | EF-2: 3 | T-1: 10 |
| Comp. Ex. 16 | PP-1: 33 | EP-1: 24 | TB-1: 5 | UK-1: 25 | EF-3: 3 | T-1: 10 |
| Comp. Ex. 17 | PP-1: 33 | EP-1: 24 | TB-1: 5 | UK-1: 25 | EF-1: 3 | T-2: 10 |

*1) 25 Parts of homo—PP was added in place of UK.

TABLE 10-continued

Property Table

|  | Gc (J/m²) | FM (kgf/cm²) | IZOD (kgf.cm/cm) | Paintability (min) | DuPont impact strength (kgf.cm) | |
|---|---|---|---|---|---|---|
|  |  |  |  |  | before painting | after painting |
| Ex. 9 | 65 | 10000 | 6.2 | >120 | >300 | >300 |
| Comp. Ex. 13 | 65 | 10000 | 6.5 | 60 | >300 | 270 |
| Comp. Ex. 14 | 60 | 10200 | 6.8 | 40 | >300 | 260 |
| Comp. Ex. 15 | 65 | 10000 | 6.0 | 60 | >300 | >300 |
| Comp. Ex. 16 | 65 | 10000 | 6.4 | 60 | >300 | >300 |
| Comp. Ex. 17 | 65 | 9700 | 3.5 | >120 | 180 | 80 |

The results summarized in Tables 7 to 10 demonstrate that all the resin compositions of the inventive Examples provided molded products having high resistance to organic solvents and excellent paintability and reduced in the decrease in DuPont impact strength caused by painting.

Table 7 further shows the following. The composition containing a polypropylene polymer having a value of $[\eta]E/P$ as low as 1.6 dl/g had an impaired IZOD impact strength (Comparative Example 1). The composition containing a polypropylene polymer having a value of $[\eta]E/P$ as high as 5.5 dl/g was impaired in IZOD impact strength, paintability, and DuPont impact strength after painting (Comparative Example 2). The composition containing a polypropylene polymer having an extremely low MFR had a significantly poor appearance although satisfactory in performances (Comparative Example 3). On the other hand, the composition containing a polypropylene polymer having too high an MFR was impaired in IZOD impact strength and DuPont impact strength after painting (Comparative Example 4).

The results for compositions which differed in ethylene/propylene rubber are shown in Table 8. The composition of Comparative Example 5, which contained an ethylene/propylene rubber having too low an MFR, had a reduced DuPont impact strength after painting, while the composition of Comparative Example 6, which contained an ethylene/propylene rubber having too high an MFR, was reduced in IZOD impact strength and DuPont impact strength after painting. The composition containing an ethylene/propylene rubber having a propylene content lower than the lower limit of the preferred range was reduced in IZOD impact strength, paintability, and DuPont impact strength after painting (Comparative Example 7). On the other hand, the composition in which the propylene content of the rubber was too high had reduced stiffness (Comparative Example 8).

Table 9 shows the following. The composition containing a triblock copolymer having too low an MFR had a considerably reduced DuPont impact strength after painting (Comparative Example 9). The composition containing a triblock copolymer having too high an MFR had an impaired IZOD impact strength and a considerably reduced DuPont impact strength after painting (Comparative Example 10). The composition containing an SEBS having too small a value of Gc was considerably reduced in IZOD impact strength and DuPont impact strength after painting (Comparative Example 11). The composition containing no SEBS was considerably reduced in paintability and DuPont impact strength after painting (Comparative Example 12).

In Table 10 is shown the effects of a modified polyolefin polymer having hydroxy groups, an oligomer having at least one terminal polar group, and talc. The composition containing a polyolefin polymer modified with too small an amount of HEMA had significantly impaired paintability (Comparative Example 13). The composition containing no modified polyolefin polymer having hydroxy groups also had significantly impaired paintability (Comparative Example 14).

The composition in which the oligomer containing terminal polar groups had too low a molecular weight had significantly impaired paintability (Comparative Example 15). The composition in which the oligomer containing terminal polar groups had too high a molecular weight also had significantly impaired paintability (Comparative Example 16).

Furthermore, the composition in which the talc had too large a particle diameter was reduced in IZOD impact strength and DuPont impact strength (Comparative Example 17).

According to the present invention, a molding or a resin composition therefor can be provided which each has high resistance to organic solvents and excellent paintability even without a primer and is reduced in the decrease in impact strength caused by painting. The composition can be utilized in a wide range of fields such as interior or exterior automotive parts, e.g., bumpers, and parts of domestic electrical appliances.

While the invention has been described in detail and with reference to specific embodiments thereof, it will be apparent to one skilled in the art that various changes and modifications can be made therein without departing from the spirit and scope thereof.

What is claimed is:

1. A resin composition comprising:
   (A) a polypropylene polymer comprising a propylene/ethylene block copolymer, said polypropylene polymer having a melt flow rate of from 5 to 100 g/10 min as measured at 230° C. under a load of 2.16 kg and containing components extractable with xylene at 20° C. and containing 100° C. xylene-insoluble components, wherein the xylene-extractable components have an intrinsic viscosity as measured at 140° C. in decalin of from 2.0 to 5.0 g/dl;
   (B) an ethylene/propylene rubber having a propylene content of from 40 to 60% by weight and a melt flow rate of from 0.5 to 10 g/10 min as measured at 230° C. under a load of 2.16 kg;
   (C) a triblock copolymer having a melt flow rate of from more than 40 to 200 g/10 min as measured at 230° C. under a load of 2.16 kg, a flat interface between said triblock copolymer and the 100° C. xylene-insoluble components of said polypropylene polymer of ingredient (A) having a critical energy release rate of 20 J/m² or higher as measured at a phase angle of from −2° to −12°, and the proportion of ingredient (C) to the sum of ingredients (A), (B), (C), (D), (E) and (F) being from 2 to 10% by weight;

(D) a modified polyolefin polymer having a hydroxy group, said modified polyolefin polymer having a content of a hydroxy-containing unsaturated compound of from 0.5 to 7.0% by weight, and the proportion of ingredient (D) to the sum of ingredients (A), (B), (C), (D), (E) and (F) being from 0.5 to 40% by weight;

(E) an oligomer having at least one terminal polar group, said oligomer having a number-average molecular weight of from 300 to 10,000, and the proportion of ingredient (E) to the sum of ingredients (A), (B), (C), (D), (E) and (F) being from 0.5 to 10% by weight; and (F) talc having an average particle diameter of 5 μm or smaller, the proportion of ingredient (F) to the sum of ingredients (A), (B), (C), (D), (E) and (F) being from 5 to 25% by weight;

wherein ingredient (C):
  (1) is hydrogenated styrene/butadiene/styrene triblock copolymer and has a styrene content of from 12 to 35% by weight, or
  (2) is a hydrogenated styrene/isoprene/styrene triblock copolymer and has a styrene content of from 12 to 35% by weight; and wherein ingredient (E) is selected from the group consisting of polybutadiene, polyisoprene, isobutylene/isoprene copolymers (butyl rubber), polybutene, butadiene/acrylonitrile copolymers, petroleum resins, and partial or complete hydrogenation products obtained from these, provided that each of these oligomers has at least one terminal functional group per molecule.

2. The resin composition as claimed in claim 1, wherein ingredient (C) is a hydrogenated styrene/butadiene/styrene triblock copolymer and has a styrene content of from 12 to 35% by weight.

3. The resin composition as claimed in claim 1, wherein ingredient (C) is a hydrogenated styrene/isoprene/styrene triblock copolymer and has a styrene content of from 12 to 35% by weight.

4. The resin composition as claimed in claim 1, wherein ingredient (E) is a hydrogenated butadiene oligomer having at least one terminal hydroxy group.

5. The resin composition as claimed in claim 1, wherein the melt flow rate of ingredient (C) as measured at 230° C. under a load of 2.16 kg is from more than 40 to 180 g/10 min.

6. The resin composition as claimed in claim 1, wherein said critical energy release rate is 30 J/m$^2$ or higher.

7. The resin composition as claimed in claim 6, wherein said critical energy release rate is from 40 to 100 J/m$^2$.

8. A molding comprising a resin composition as claimed in claim 1.

9. A molding for an automotive part comprising a resin composition as claimed in claim 1.

* * * * *